Aug. 16, 1932.   S. J. HADDAD   1,871,606
PORTABLE TRIMMING DEVICE
Filed June 10, 1930
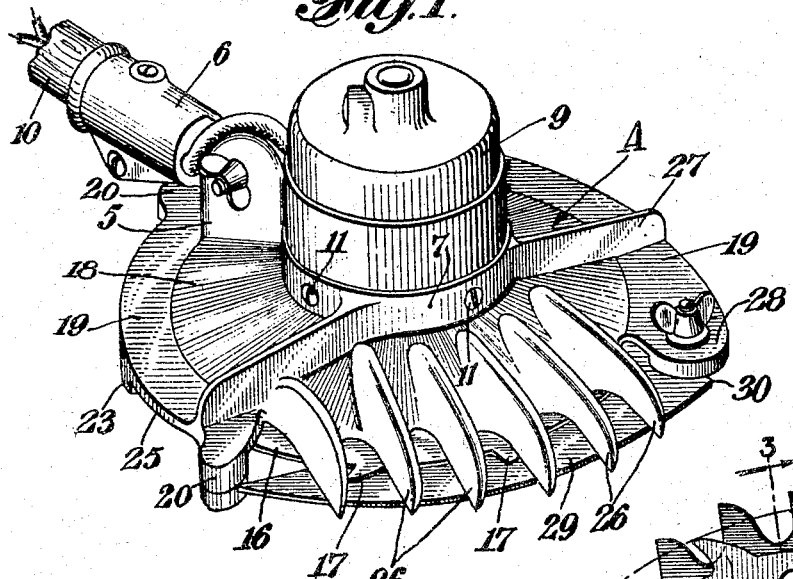
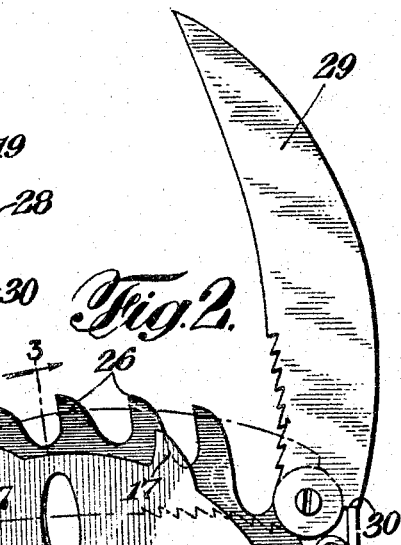
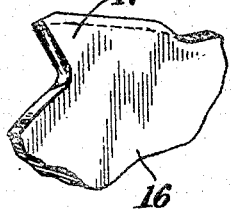
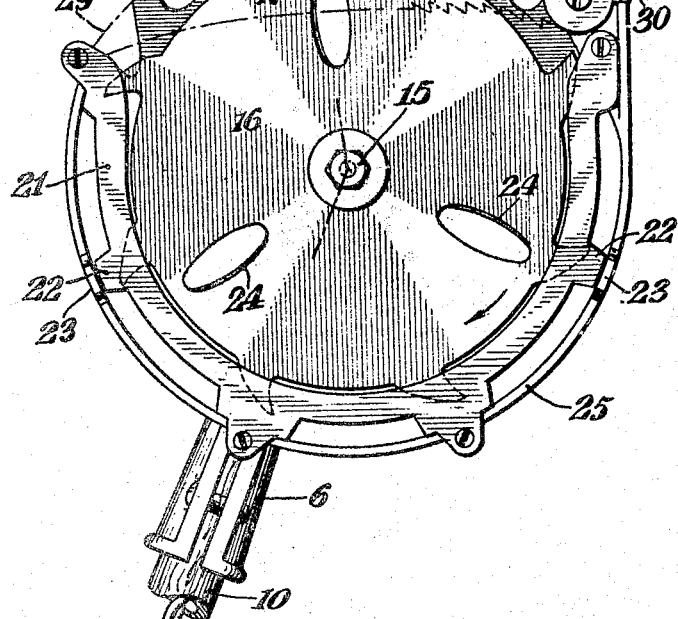
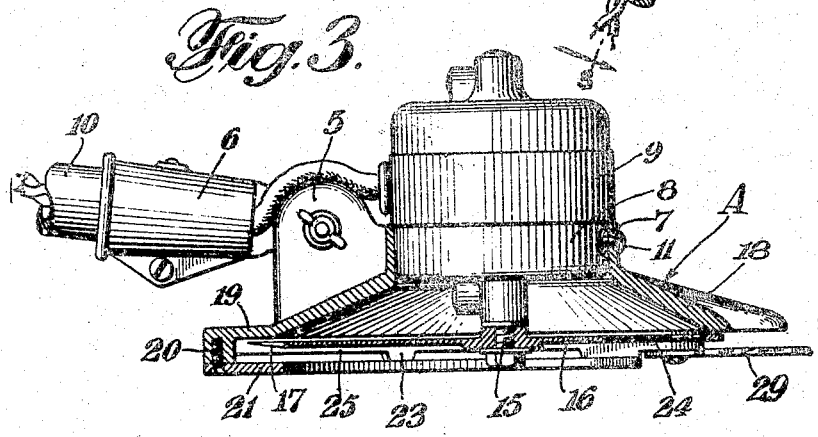
INVENTOR
Saleem J. Haddad
BY
Ward, Crosby & Neal
ATTORNEYS Patented Aug. 16, 1932

1,871,606

UNITED STATES PATENT OFFICE

SALEEM J. HADDAD, OF TENAFLY, NEW JERSEY

PORTABLE TRIMMING DEVICE

Application filed June 10, 1930. Serial No. 460,152.

This invention relates to a portable trimming device that can be used for cutting and trimming hedges and for similar purposes wherein a continuously driven circular saw is employed and combined with other parts, as hereinafter described, enabling the device to be continuously moved along a hedge to be trimmed in such a manner that the twigs will be progressively fed to the saw, cut and thrown clear of the device without clogging or jamming.

Among the objects of this invention are the production of a trimming device comprising a small number of parts which are of rugged construction and which may be readily assembled; the provision of a main body portion upon which a handle may be mounted, and upon which the motor may be detachably secured in rigid position; the provision of a body portion with integral guard teeth; the provision of means for protecting the user; the provision of means for preventing clogging or jamming of the saw; and the provision of a reversible saw. Other objects of the invention will be in part obvious and in part specifically pointed out in the specification which, taken in connection with the accompanying drawing, discloses a preferred embodiment of the invention. The disclosure, however, is to be considered as merely illustrative of the principles of the invention.

In the drawing:

Fig. 1 is a perspective view of a trimming device constructed in accordance with the principles of my invention, showing the guide bar in closed position;

Fig. 2 is a bottom plan view of the device showing the guide bar in open position in full lines and in closed position in broken lines;

Fig. 3 is a vertical section on the line 3—3 of Fig. 2, and

Fig. 4 is an enlarged detailed view of a tooth of the saw.

As shown in Figs. 1 and 2, the device comprises a body portion A which is provided with a lug 5 to which a split handle holder 6, of usual construction, may be adjustably secured by well known means so that the angular position of the handle with respect to the body portion A may be adjusted to suit the requirements.

The body portion A is provided with a vertical circular flange 7, Figs. 1 and 3, adapted to snugly receive the reduced end 8 of the motor casing 9. The leads supplying current to the motor may extend out through the holder 6 and through the handle 10. As well understood, a switch may be mounted on the handle for closing and opening the circuit to the motor. The motor casing is preferably secured to the flange 7 by screws 11 as indicated in Figs. 1 and 3. By the provision of these means a motor may be readily attached to or detached from the body portion A, and when attached it will be held securely in position with respect to the body portion A.

The projecting end of the commutator shaft of the motor is preferably threaded to receive a screw bolt 15 by means of which a circular saw 16 may be secured to the shaft. This saw is preferably provided with teeth 17, as shown in Fig. 4 in detail, which are provided with cutting edges on each side so that the saw plate may be reversed as conditions may require. As shown in Fig. 4, one edge of the saw tooth extends substantially radially of the saw, while the other edge of the saw tooth extends obliquely at any suitable angle as shown.

The saw rotates in a clockwise direction as indicated in Fig. 2, and for cutting new growth on a hedge it is preferable to mount the saw as shown in this figure so that the longer edges of the teeth will do the cutting. If it is desired to cut old growth it is preferable to reverse the saw so that the edges which extend substantially radially of the saw will do the cutting.

As shown in Figs. 1 and 3, the body portion A comprises a bell-shaped or conical portion 18 which provides a space between the motor and saw to prevent clogging or jamming at this point. Surrounding this bell-shaped portion is an interrupted circular portion 19 which acts as a guard for the saw. Formed along the outer edge of this circular portion are depending lugs 20 certain of which constitute spacing devices for spacing a guard plate 21, Figs. 2 and 3, from the circular portion 19 to provide an operating space for the periphery of the saw. The guard plate 21 is preferably secured to the depending lugs 20 by screws, as shown. As indicated in Fig. 2 the guard plate 21 may be provided with lugs 22 which, together with lugs 23, formed on the member 19 also act as guards for the saw. The spaces provided between the guard plate 21 and the circular portion 19 and the lugs 20, 22 and 23 facilitate the ejection of finely cut material that may be carried into the space between the circular portion 19 and the guard 21, and thus prevent clogging and jamming of the saw. To further facilitate the ejection of finely cut material that may be carried into the bell-shaped portion 18, the saw is preferably provided with apertures 24, such as shown in Fig. 2.

As shown in Figs. 1, 2 and 3 the circular portion 19 is provided with a flange 25 upon which the lugs 23 may be formed. This flange projects below the plane of the saw. Parts 19, 20, 21, 22 and 23 may be made integral if so desired.

The forward end of the body portion A, at the point where the flange 19 is interrupted, may be provided as shown in Fig. 1 with guard teeth 26 which be may extended over the body portion A, as shown, in order to provide strong guard teeth and to permit of the use of narrow teeth. As shown, one edge of each of these teeth is substantially straight and the corresponding edges of all of these teeth extend substantially parallel to each other as indicated in Fig. 2. The other edges of the teeth are preferably curved and generally extend at an angle to the first mentioned edges so that the material to be cut will be bent in the direction of the movement of the saw, thus facilitating the cutting of the material.

The circular portion 19 is preferably provided with a pivot lug 28, Fig. 1, upon which a guide plate 29, Figs. 1, 2 and 3, may be pivotally mounted. The guide plate is provided with a shoulder 30 which in the open position of the plate abuts against the flange 25 depending from the circular portion 19. By means of the butterfly nut shown in Fig. 1 the guide plate 29 may be held in open position as indicated in full lines in Fig. 2, or in the closed position in which it acts as a guard as indicated in broken lines in Fig. 2. In the open position shown in Fig. 2 the guide acts as a means for separating or parting the hedge, and its inner edge extends substantially parallel to the straight edges of the guard teeth 26. The rear portion of the inner edge of the plate is provided with teeth, as shown, which prevent the hedge from being pushed forwardly as the knife is rotated.

As shown in Fig. 2, the guide bar 29 is made comparatively wide so that it may be used as a guide and may be moved along the top of the hedge that has been trimmed to assist in guiding the device to cut any twigs that may be projecting and which were left uncut during the first trimming operation.

The body portion may be provided with braces 27, as shown in Fig. 1, connected to the flange 7 and extending to the circular portion 19.

The device disclosed includes provision for preventing clogging and jamming of the saw and for the ejection of finely cut material that may get behind the saw, or the saw and the portions 19 and 21. By securing the handle holder to the body portion A it is possible to provide means for readily detaching the motor for repair or oiling whenever necessary. By locating the guard teeth, as shown, above the cutter and forming them on the plate A it is possible to make these teeth of any height to get the required strength without interfering with the trimming operation. By constructing the teeth of the saw as described, either of the edges of the teeth may be used for cutting as conditions require.

While one form of the invention has been shown and described with particularity it is to be understood that the various novel features shown and described may be varied as to form, and that the expressions used in the description and the claims are words of description and not words of limitation.

I claim:

1. A trimming device including a rotary saw, a plate-like member substantially parallel to and slightly spaced from said saw, and a plurality of fingers on said plate-like member located near the periphery of the saw, the saw having teeth with both side edges sharpened, one side edge being substantially radial and the other side edge running obliquely, said saw being reversible so as to cut selectively with either of said side edges.

2. A trimming device including a circular saw, a plate-like member substantially parallel to and slightly spaced from said saw, an interrupted circular guard member overlying the opposite face of the saw and secured to the first member, a series of guard fingers on one of said members located peripherally with respect to the saw and in the interrupted portion of said guard member, and a guide member pivoted to said plate-like member so that it may be swung into overlapping position with respect to the portion of the periphery of the saw left exposed by the guard member.

3. A trimming device including a circular saw, and a plate-like member provided with an annular portion substantially parallel to and slightly spaced from one side of the saw near its periphery and provided with a central raised portion providing a large open space between the saw and the plate-like member, said saw being provided with openings therein to permit the ejection of trimmings therethrough from the space between the plate-like member and the saw.

4. In a trimming device the combination of a frame member, a circular saw, and an interrupted annular channel member rigid with the frame member and embracing the periphery of the saw, said annular channel member being provided with apertures opening radially and downwardly and lying below the plane of the saw.

5. In a trimming device the combination of a frame member, a handle on the frame member, a motor mounted on the frame member, a circular saw driven by said motor, and guard teeth formed on said frame member and extending beyond the periphery of the frame member and the saw, one side of each guard tooth being substantially straight and corresponding straight sides of the guard teeth extending substantially parallel to the direction of movement of the trimming device when in use, the other side edges of the guard teeth extending at an angle to the first mentioned sides of the guard teeth and in the direction of the movement of the saw.

6. In a trimming device the combination of a frame member, guard teeth on the forward side of the frame member, and a guide member pivoted on said frame member adapted when in open position to part the material to be cut and when in its closed position to provide a guard for a portion of the saw opposite the guard teeth.

7. In a trimming device the combination of a frame member, guard teeth on the forward side of the frame member, a guide member pivoted on said frame member adapted when in open position to part the material to be cut and when in its closed position to provide a guard for a portion of the saw opposite the guard teeth, and means for limiting the opening movement of the guide member in a position substantially parallel to the guard teeth.

8. In a trimming device the combination of a frame member, a handle secured to the frame member, a circular saw spaced from said frame member, and guard teeth formed on one side of said frame member and extending beyond the periphery of the saw, said guard teeth being relatively narrow and relatively high, the upper portion of the guard teeth being continued over the frame member and being rigid therewith.

In testimony whereof I have signed my name to this specification.

SALEEM J. HADDAD.